(No Model.)
J. KRUESI.
UNDERGROUND ELECTRICAL CONDUCTOR.
No. 275,776. Patented Apr. 10, 1883.
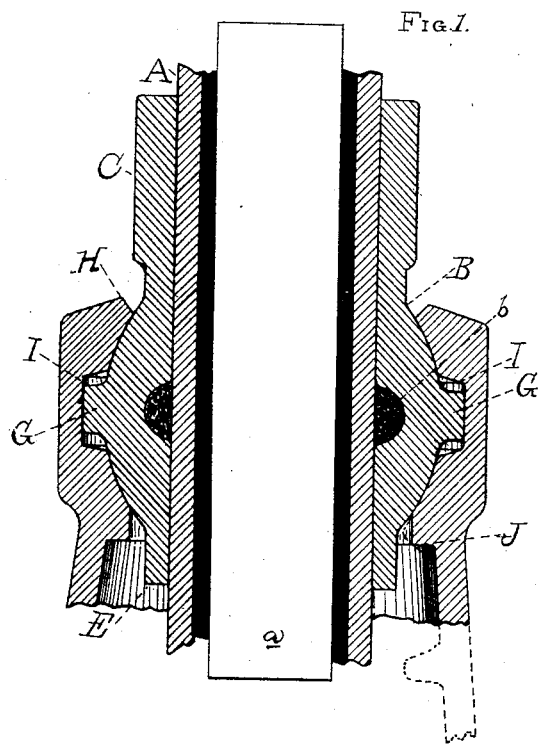
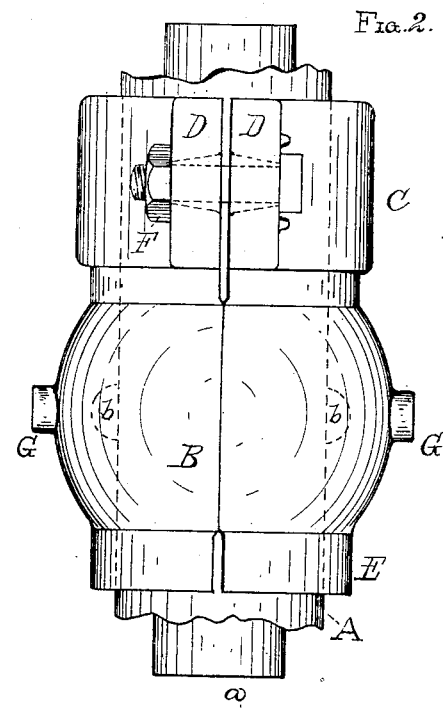
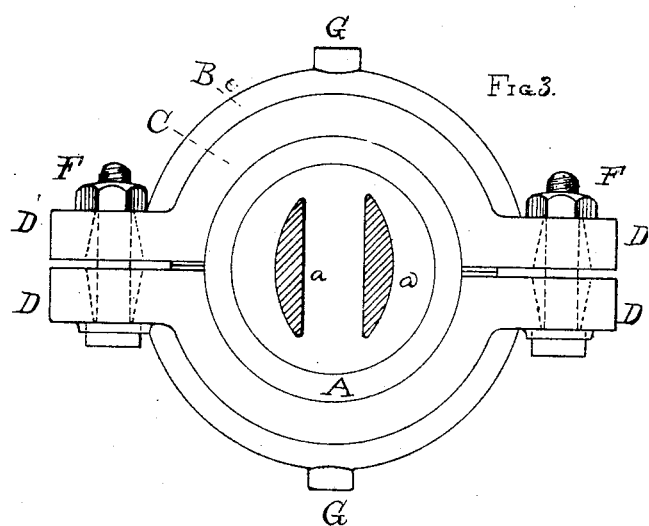
ATTEST:
Chas. C. Rowland
H. W. Seely
INVENTOR:
John Kruesi,
By Rich'd N. Dyer,
Atty.

UNITED STATES PATENT OFFICE.

JOHN KRUESI, OF BROOKLYN, NEW YORK.

UNDERGROUND ELECTRICAL CONDUCTOR.

SPECIFICATION forming part of Letters Patent No. 275,776, dated April 10, 1883.

Application filed October 9, 1882. (No model.)

*To all whom it may concern:*

Be it known that I, JOHN KRUESI, of Brooklyn, in the county of Kings and State of New York, have invented a certain new and useful Improvement in Junctions for Underground Electrical Conductors, of which the following is a specification.

My invention relates to the boxes used for joining the ends of the conductors used in systems of electrical distribution, which conductors are placed in metal tubes laid under ground; and said invention is applicable to all the various kinds of junction-boxes so used—coupling-boxes, elbow-boxes, T-boxes, &c.

My object is to so construct the tube-openings of the boxes and the tubes at the points where they enter such openings that said tubes may enter said boxes at any desired vertical, horizontal, or other angle, as is often rendered necessary on account of the tube being deflected from a straight line, and also that the boxes may be prevented from turning on the tubes. To accomplish this I connect the end of a tube with the box by an arrangement similar to a ball-and-socket joint, forming the ball upon the tube preferably by clamping two hemispherical metal pieces thereon, and forming the tube-opening so as to receive such ball. The end of the tube projects beyond the ball within the box, and a rib within the box is so placed that said end will strike against it, and thus limit the angle at which the tube may enter the box to the desired extent. Projections on the surface of the ball enter depressions in the side of the tube-opening, and thus prevent the tube from turning axially in said opening. Such depressions, however, are of such size and form as not to limit the play of the ball in the socket.

My invention is illustrated in the accompanying drawings, wherein Figure 1 is a vertical section, showing the ball clamped upon the tube and placed within the tube-opening; Fig. 2, a side elevation of the ball and tube; Fig. 3, an end view thereof.

A is the tube which contains the conductors *a*. Upon the body of said tube, near its end, is placed the ball B. From such ball extends the sleeve C, having lugs or projections D D on opposite sides, and at the other side of the ball the collar E may extend; or this may be dispensed with, as will be hereinafter explained. The whole of this device is formed, as shown, in two longitudinal halves, which are placed together, so as to surround the tube, and fastened by means of bolts F passing through the projections D D. On opposite sides of the ball B are formed the projections G G.

In Fig. 1, H is the tube-opening of the box, having its sides formed to receive the ball B by being hollowed out in spherical shape. Such sides have depressions I I, which receive the projections G G.

As stated, the collar E may be omitted. Such collar is used at times when a tube smaller than that for which the box was intended is placed therein, for in a system of electric lighting the conductors, and consequently the tubes which hold them, may be smaller in some parts of the district than in others, and as in manufacturing the boxes it is desirable to make them of a few sizes only, while the tubes are many sizes, it is necessary frequently to increase the size of the tube by the use of the collar, as will be seen.

The ball B is free to move in any direction in the tube-opening; but the extent of such movement is limited by the tube A (or collar E when the latter is used) striking against the rib J. Such rib may be placed farther within the box, as shown in dotted lines, according to the extent to which it is desired to allow the angular deviation when the collar E is dispensed with. An aperture should be formed in the rib, when located as shown in dotted lines, to allow the insulating substance with which the box is filled to penetrate to the tube-openings.

It is evident that all the forms of junction-boxes used in underground systems of electrical conductors may be provided with tube-openings of the form shown, the tubes which enter them being provided with the balls fitting in such openings. The halves of the ball B are provided with a groove, *b*, which is filled with putty or other material to prevent the admission of moisture to the box, and also to prevent the compound from running out of the box around the tube.

What I claim is—

1. The combination, with a junction-box, having a tube-opening with spherical walls, of a tube passing wholly through said opening into the interior of the box, and containing electrical conductors, and a ball upon the body of said tube working in the spherical tube-opening, substantially as set forth.

2. The combination, with the ball on the tube, of the socket formed in the tube-opening for receiving said ball, provided with the rib for limiting the movement of said ball in said socket, substantially as set forth.

3. The combination, with a junction-box having a tube-opening with spherical walls, of a tube passing through said opening into the interior of the box, and containing electrical conductors, and a ball composed of two parts, clamped upon the body of said tube and working in the spherical tube-opening, substantially as set forth.

4. The combination, with the ball having projections on opposite sides, of the socket for receiving said ball, having depressions corresponding to said projections, but larger than the projections, substantially as set forth.

5. The combination, with the ball on the tube, provided with the collar extending inwardly from said ball, of the socket receiving said ball, provided with the rib against which said collar strikes, whereby the movement of the ball is limited, substantially as set forth.

This specification signed and witnessed this 23d day of September, 1882.

JOHN KRUESI.

Witnesses:
RICHD. N. DYER,
H. W. SEELY.